Patented Oct. 31, 1933

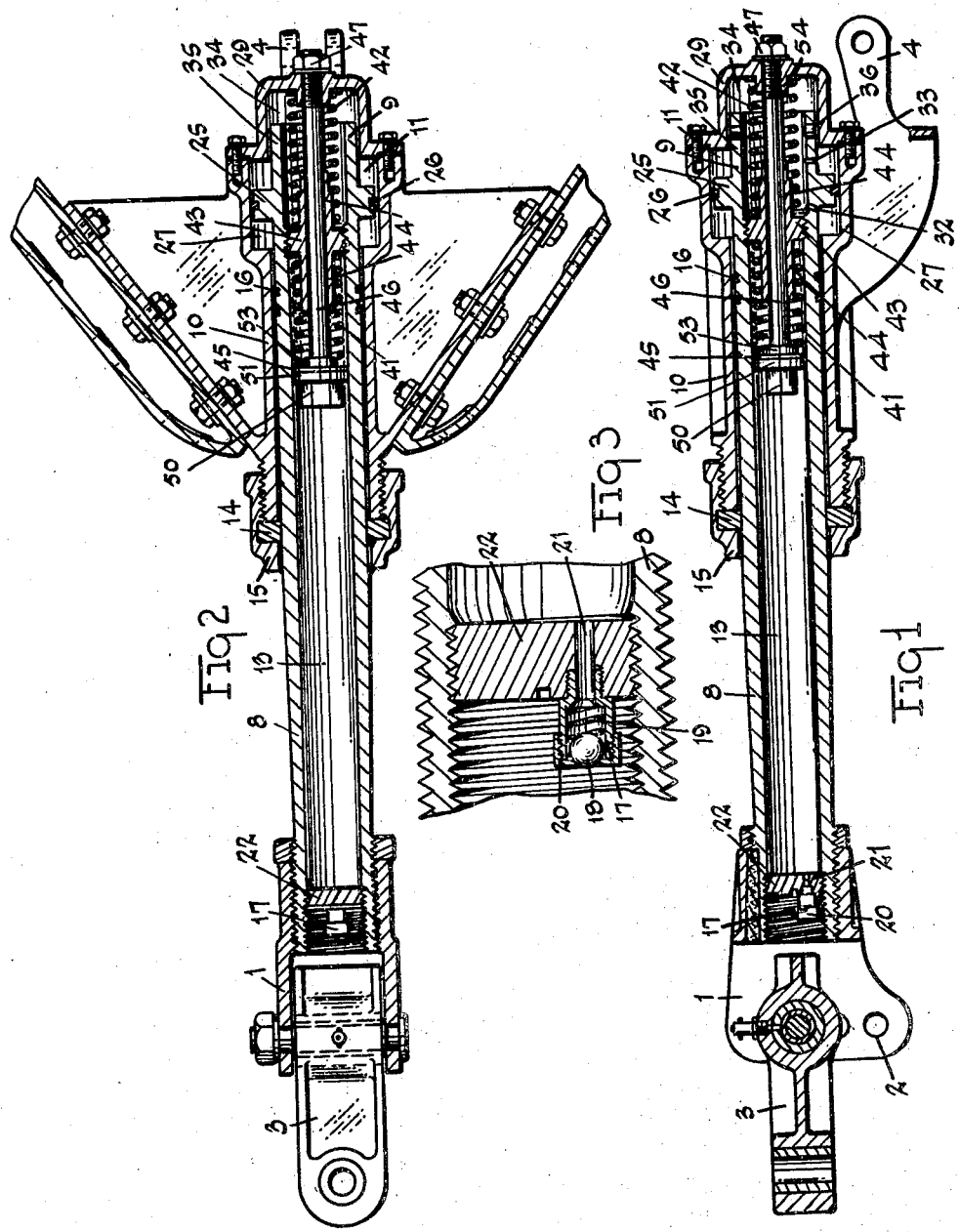

1,933,387

UNITED STATES PATENT OFFICE 1,933,387

CUSHIONED HITCH

Julius Wesley Patterson, Omaha, Nebr.

Application April 13, 1932. Serial No. 604,906

10 Claims. (Cl. 280—33.9)

My invention has for its object to provide a cushioned hitch for absorbing the draft shock caused by sudden or rapid change in speed, as in quick starting of a drawn body or vehicle, or when the drawn article meets a sudden resistance to movement. The invention particularly provides for the creation of an oil yielding resistance and a counter air pressure that absorbs or cushions the effect of a sudden force resistant to the normal movement of the vehicle produced by drawing or dragging an article, such as a vehicle, by a propelling force transmitted through the hitch to the vehicle.

The invention may be used for interconnecting horses or tractors or an engine to a plurality of vehicles, such as scoops, wagons, cars, agricultural implements of different forms, etc.

The invention consists of other features which will appear from the following descriptions and upon examination of the drawing. Structures containing the invention may partake of different forms and may be varied in their details and still embody the invention. To illustrate a practical application of the invention, I have selected a shock absorbing hitch embodying the invention as a sample of the various structures and the details of such structures that contain the invention and shall describe the selected structure hereinafter, it being understood that variations may be made and that certain features of my invention may be used to advantage without a corresponding use of other features of the invention, but without departing from the spirit of the invention. The particular structure selected is shown in the accompanying drawing.

Fig. 1 illustrates a vertical section of the hitch.
Fig. 2 illustrates a horizontal section of the hitch.
Fig. 3 illustrates an enlarged detailed view of a part of the hitch.

The particular hitch illustrated in the drawing may be advantageously used for connecting together a train of vehicles and connecting the train with a tractor. It is provided with a clevis 1 having a plurality of openings 2 for connecting a hitch block 3 with the draw bar of the tractor or other propelling means, or with the frame of a leading vehicle. The holes 2 provide for making connections at different heights to maintain the hitch in substantially horizontal positions. It is also provided with a pair of ears 4 that protrude rearwardly for connecting with the vehicle that is drawn by the propelling force. The hitch is so constructed as to absorb shocks occurring by reason of the vehicle striking an object, such as entering a deep rut or striking a stone, or reducing the jerk occurring from starting of the vehicle or the train of vehicles. The hitch has parts that are formed to contain a pressure medium for the transmission of pressure that resistantly yields to movement of the parts of the hitch and also operates to restore the parts of the hitch to their normal relation when the drawing force becomes substantially constant.

The hitch is provided with a hollowed member 3 having a piston part 9 and a second hollow member 10 having a cylinder part 11. The member 10 surrounds one end of the member 8 and is slidably movable relative thereto, the two members forming a telescoping construction, one of which is connected by means of the clevis 1 to the drawing member of the train and the other by means of the ears 4 to the vehicle that is propelled. The member 8 is rotative within the member 10 and thus affords, with the clevis, a universal joint connection between opposite ends of the hitch. The member 8 has a chamber 13 that may be partially filled with oil, or other liquid pressure transmission medium. The oil fills slightly more than one-half of the chamber 13 and the cylinder part 11 of the member 10. Escape of the oil is prevented by a suitable packing ring 14 that may be secured to and packed against the end of the member 10 and the surface of the member 8 by the gland nut 15. Also, steel rings 16, in the form of piston rings, may be located in grooves formed in the member 13 located in the vicinity of the piston and cylinder parts of the members 8 and 10 and so as to move in sealing contact with the interior of the member 10, and horizontal adjustment of the latch at the clevis locates the liquid level parallel to the axis of the hitch.

The chamber 13 and the cylinder part 11 of the member 10 may be filled through a suitable check valve 17 having a ball 18 that is spring pressed by means of the spring 19 to close the opening in a cap 20 and through which oil may be inserted into the chamber 13. The passageway 21 formed through a plug 22 is located, preferably, below the center of the plug 22 to prevent the escape of air entrapped above the surface of oil and enable increase of the pressure of the air within the members by the addition of oil.

The rear end of the member 8 is provided with a flanged part 25 having a piston ring 26. The flanged part 25 and its piston ring 26 is located within the cylinder 27 having a diameter considerably larger than the diameter of the member 8. The cylinder 27 is closed by a cap 29 having an inner diameter less than that of the cylinder 27, and preferably, substantially the same as the diameter of the rear end of the member 8 that protrudes rearwardly from the flanged part 25. The members 8 and 10 thus form a double cylinder and piston construction that interfit and produce a shock absorbing means through the oil and also the difference in air pressures produced within the interior of the members 8 and 10. The wall of the member 8, on opposite sides of the flanged part 25, is provided with restricted passageways 32 and 33 and establishes communication with portions of the cylinder 27 located on opposite sides of the larger piston part 25. The passageways 32 and 33 are located in the lower part of the wall of the member 8 to prevent movement of air therethrough. When, therefore, the member 8 is drawn forward relative to the member 10, the oil passes through the passageway 32 into the interior of the member 8 and the cylinder 34 formed within the cap 29. Such forward movement, however, reduces the air pressure of the air located within the cap 29 by reason of the fact that the oil displacement on the forward side of the larger piston 25 is less than the reduction of the volume occurring within the cylinder part 11 of the member 10 by such relative forward movement of the larger piston 25 and the atmospheric pressure of the air within the chamber 13 cooperates with the restricted movement of the oil to cushion the forward movement of the member 8. The suction of the air or difference in air pressures produces a slight movement of oil from the chamber 13 into the cylinder part 11 of the member 10. If the member 8 is drawn forward relative to the member 10 sufficiently to locate the piston 26 near the forward end of the cylinder, that is, if the drawing force is sufficiently great to cause an extreme forward movement of the member 8 relative to the member 10, communication is established between the cylinder 27 and the cylinder 34, either by reason of the shortness of the smaller piston part 35 or by reason of slots or ports that may be cut therein to establish the connection between the two cylinder parts and yet maintain piston and cylinder alignment and surface contact. In the form of construction shown, the smaller piston part 35 is provided with the ports 36 located near the end of the piston part 35 but which are uncovered when the drawing force of the vehicle is sufficiently great to move the larger piston part 25 to a point near the forward end of the cylinder 27. This introduces into the cylinder 27, at the rear of the larger piston part 25, a full supply of oil. Assuming that the restriction of the passageways 32 and 33 and the rise in the propelling force is sufficiently rapid as to prevent the filling of the rear end of the cylinder 27 by the oil displaced from the forward end of the cylinder 27, the oil from within the rear end of the member 8 and the cap 29 will fill this space and upon return movement of the member 8, relative to the member 10, such movement will be absorbed by the restriction to the flow of this additional oil through the passageway 33. Thus the invention produces means for producing a vacuous condition within the cylinder when an excess force is applied to the vehicle and upon cessation of such excess force the part of the cylinder to the rear of the larger piston of the hitch is charged with a full supply of oil and the return movement of the oil from that part of the cylinder is restricted to gradually absorb the return movement of one part of the hitch relative to the other.

The members of the hitch are maintained in their normal relation by a pair of counterbalancing springs 41 and 42 of relative light pressure. The springs operate merely to centralize piston parts relative to the cylinder parts whenever the pressure transmitted through the hitch is released. The springs 41 and 42 are supported on a block 43 having suitable guiding bosses 44, located within the helical springs. One end of each of the springs abut on opposite faces of the threaded plug 43. The spring 42 engages the bottom of the cap 29 while the remaining end of the spring 41 engages a washer 45 located on a rod 46 that may be threaded into the bottom of the cap 29 and secured by means of the nut 47. The rod 46 has a suitable head 50, the head having a hexed portion for rotating the rod 46 to screw it into the end of the cap 29 and a flanged portion 51 that loosely fits the cylindrical surface of the chamber 13 and operates to maintain the forward end of the rod 46 co-axial with the member 8. The washer 45 has a boss 53 located within the end of the helical spring 41 and operates to maintain the forward end of the spring 41 centrally with respect to the axis of the member 8. Also, the cap 29 is provided with a boss 54 which likewise centers the rear end of the spring 42. On account of the backward and forward movements, the springs creep circularly with respect to the rod 46 and the bosses located on the washer 45, the plug 43 and the cap 29, permit free creeping or rotative movement of the springs and yet maintain the springs in axial relation to the members 8 and 10.

The plug 43, being secured to the rear end of the member 8 and the rod 46 being secured to the rear end of the member 10, and the springs 41 and 42 being located on the opposite sides of the plug 43, the springs operate as a means for transmitting the forces exerted by the member 8 in one direction or the other to the member 10 and consequently movement of the member 10 relative to the member 8, is not only yieldingly resisted by the springs, but also by the oil and air located within the cylinders of the member 10. The pressures of the air and oil is rendered yieldable by the restricted movement of the oil through the passageways 32 and 33 located in the lower part of the rear end of the member 8. When the drawing force is restored the oil pressure becomes nil more quickly than the air pressure, but eventually the normal drawing force is transmitted through the leading spring by a slower oil displacement. On account of the excess displacement produced by a rearward movement of the member 10 relative to the member 8, less than atmospheric pressure will be produced in the rear end of the cylinder part 11 of the member 10 and oil will be drawn from the chamber 13 through a very restricted passageway that may be located in a plug 43. In the form of construction shown, the rod 46 is slightly smaller than the bore of the plug 43 through which the rod 46 extends to form a small amount of clearance. The diameters, however, are sufficiently close to maintain a film of oil that completely fills the space between them. This enables a restricted movement of the oil into the cylinder part 11 of the member 10, but limits movement of air. Also, the film of oil filling the space between the rod and the plug and its bosses resists by adhesion on the movement of the oil. The chamber 13 is preferably nearly filled with oil, the leakage, however, in time reducing the amount to one-half whereupon the chamber is again nearly filled. The check valve 17 is located below the center of the plug 22 so that air cannot escape from the hitch and cannot freely pass into the cylinder part 11 of the chamber by reason of the filmed surface of the oil on the rod 46. The vacuous condition created by the piston parts causes the air to force the oil along the rod 46.

I claim:

1. In a shock absorbing hitch, a member having a hollow piston part and a member having a cylinder part, the piston having restricted passageways interconnecting opposite sides of the piston with the interior of the piston and with one end of the cylinder part, the piston at the said end of the cylinder part having a greater displacement than the other end of the said cylinder and piston, and means for restoring the members to their relative normal force transmitting positions when relatively displaced therefrom by an excess force.

2. In a shock absorbing hitch, a member having a piston part and an oil chamber and a member having a cylinder part, the piston having a restricted passageway interconnecting opposite sides of the piston, the first named member having a restricted passageway interconnecting the oil chamber with the cylinder part of the other member, counterbalancing springs for restoring the members to their normal force transmitting positions when relatively displaced therefrom by the application of an excess force.

3. In a shock absorbing hitch, a member having a piston part and a chamber for containing oil and air, a second member having a cylinder part for containing oil and air, the piston having restricted passageways interconnecting opposite sides of the piston and the piston and cylinder having a restricted passageway interconnecting the chamber of the first named member with the cylinder of the other member, the first named member extending through one end of the cylinder and producing a greater displacement of the piston when the member is moved outwardly with respect to the cylinder than when the member is moved inwardly to produce air pressure differences upon relative movement of the said members.

4. In a shock absorbing hitch, a member having double piston parts of different displacement areas, a second member having double cylinder parts of different diameters fitting the corresponding piston parts of the first named member, the first named member having restricted passageways interconnecting opposite sides of the larger piston part and one side of the smaller piston part and producing a larger piston displacement upon movement of the one member relative to the other in one direction than is produced by relative movement in the opposite direction.

5. In a shock absorbing hitch, a member having double piston parts of different displacement areas, a second member having double cylinder parts of different diameters fitting the corresponding piston parts of the first named member, the first named member having restricted passageways interconnecting opposite sides of the larger piston part and one side of the smaller piston part, and producing a larger piston displacement upon movement of the one member relative to the other in one direction than is produced by relative movement in the opposite direction, the smaller piston part having means for connecting the smaller cylinder part with the larger cylinder part upon extreme movement of the members relative to each other.

6. In a shock absorbing hitch, a member having a piston part and a chamber for containing oil and air, a second member having a cylinder part for containing oil and air, the piston having restricted passageways located in the lower side of the wall of the first named member and interconnecting opposite sides of the piston, and the piston and cylinder having a restricted passageway interconnecting the chamber and the cylinder part, a rod connected to the cylinder part and extending through the piston part, and springs located intermediate the piston part and the ends of the rod, the air and the oil and the spring operating to yieldingly resist relative movement of the said members and restore the said members to their relatively normal positions.

7. In a shock absorbing hitch, a member having a piston part and a chamber for containing oil and air, a second member having a cylinder part for containing oil and air, the piston having part for containing oil and air, the piston having restricted passageways interconnecting opposite sides of the piston and the piston and cylinder having a restricted passageway interconnecting the chamber and the cylinder part, a rod connected to the cylinder part and extending through the piston part, and springs located intermediate the piston part and the ends of the rod, the air and the oil and the springs operating to yieldingly resist relative movement of the said members and restore the said members to their relatively normal positions, means for introducing oil into the chamber at a point near the bottom of the chamber.

8. In a shock absorbing hitch, a member having a pair of piston parts of different diameters and a chamber for containing oil, a second member having a pair of cylinder parts corresponding to the piston part and for containing oil, the piston having restricted pasageways interconnecting opposite sides of the larger of the piston parts and one side of the smaller piston part and the smaller piston part having a passageway for connecting the smaller cylinder part with the larger cylinder part upon extreme movement of the piston parts relative to the cylinder parts, and the said members having a restricted passageway interconnecting the cylinder parts with the chamber.

9. In a shock absorbing hitch, a member having a pair of piston parts of different diameters and a chamber for containing oil, a second member having a pair of cylinder parts corresponding to the piston part and for containing oil, the piston having restricted passageways interconnecting opposite sides of the larger of the piston parts and one side of the smaller piston part, and the smaller piston part having a passageway for connecting the smaller cylinder part with the larger cylinder part upon extreme movement of the piston parts relative to the cylinder parts, a rod connected to the smaller cylinder part and extending through the piston part and forming a restricted passageway between the chamber and the cylinder parts, springs located intermediate one of the piston parts and the ends of the rods for restoring the piston parts relative to the cylinder parts to their normal positions when displaced therefrom by an abnormal force.

10. In a shock absorbing hitch, a member having a pair of piston parts of different diameters and a chamber for containing oil, a second member having a pair of cylinder parts corresponding to the piston part and for containing oil, the piston having restricted passageways interconnecting opposite sides of the larger of the piston parts and one side of the smaller piston part, and the smaller piston part having a passageway for connecting the smaller cylinder part with a larger cylinder part upon extreme movement of the piston parts relative to the cylinder parts, a rod connected to the smaller cylinder part and extending through the piston part and forming a restricted passageway between the chamber and the cylinder parts, springs located intermediate one of the piston parts and the ends of the rods for restoring the piston parts relative to the cylinder parts to their normal positions when displaced therefrom by an abnormal force, the smaller piston part having a passageway for connecting the smaller cylinder part with the larger cylinder part upon extreme movement of one member relative to the other.

JULIUS WESLEY PATTERSON.